United States Patent
Kim (10) Patent No.: US 8,229,667 B2
(45) Date of Patent: Jul. 24, 2012

(54) METHOD FOR DISPLAYING BACKGROUND SKY IN NAVIGATION SYSTEM AND APPARATUS THEREOF

(75) Inventor: Hak Soo Kim, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 869 days.

(21) Appl. No.: 12/298,482

(22) PCT Filed: Jan. 26, 2007

(86) PCT No.: PCT/KR2007/000464
§ 371 (c)(1),
(2), (4) Date: Oct. 24, 2008

(87) PCT Pub. No.: WO2007/126198
PCT Pub. Date: Nov. 8, 2007

(65) Prior Publication Data
US 2009/0088970 A1 Apr. 2, 2009

(30) Foreign Application Priority Data
Apr. 27, 2006 (KR) ........................ 10-2006-0038213

(51) Int. Cl.
*G01C 21/30* (2006.01)
(52) U.S. Cl. ........ 701/408; 701/400; 701/409; 701/412; 701/415; 701/418; 701/430; 701/436; 701/439; 701/448; 701/467; 340/988; 340/989; 340/990; 340/991; 340/992; 340/993; 340/994; 340/995; 340/996; 715/850; 715/852; 715/861
(58) Field of Classification Search .................. 701/400, 701/408
See application file for complete search history.

(56) References Cited

U.S. PATENT DOCUMENTS

| | | | | |
|---|---|---|---|---|
| 5,948,043 A * | 9/1999 | Mathis | ........... | 701/208 |
| 6,023,653 A * | 2/2000 | Ichimura et al. | .............. | 701/208 |
| 6,038,510 A * | 3/2000 | Lee | ................ | 701/213 |
| 6,421,604 B1 * | 7/2002 | Koyanagi et al. | ............. | 701/208 |
| 6,611,753 B1 | 8/2003 | Millington | | |
| 7,103,232 B2 * | 9/2006 | Kotake et al. | ................. | 382/282 |
| 7,801,676 B2 * | 9/2010 | Kurosawa et al. | ............ | 701/209 |
| 2004/0249565 A1 | 12/2004 | Park | | |

(Continued)

FOREIGN PATENT DOCUMENTS

JP 09-329450 A 12/1997

(Continued)

OTHER PUBLICATIONS

International Search Report for PCT/KR2007/000464, mailed Apr. 25, 2007; 2 pages.

(Continued)

*Primary Examiner* — Bradley B. Bayat
(74) *Attorney, Agent, or Firm* — Saliwanchik, Lloyd & Eisenschenk (57) ABSTRACT

A method of displaying a background sky in a navigation system, the method including: storing and maintaining map data and background sky image data with respect to one or more directions of the map data in a database; detecting a driving direction angle of a vehicle; computing a position of a background sky image corresponding to the detected driving direction angle; extracting background sky image data corresponding to the computed position of the background sky image from the database; and displaying the extracted background sky image data as a background sky with respect to the map data.

6 Claims, 9 Drawing Sheets

U.S. PATENT DOCUMENTS

2005/0228586 A1 * 10/2005 Yuasa et al. .................. 701/208
2005/0261826 A1 * 11/2005 Kurosawa et al. ............ 701/208

FOREIGN PATENT DOCUMENTS

| | | |
|---|---|---|
| JP | 11-271067 | 10/1999 |
| JP | 2000-346658 A | 12/2000 |
| JP | 2001-027532 A | 1/2001 |
| JP | 2001-083872 A | 3/2001 |
| JP | 2002-116030 A | 4/2002 |
| JP | 2004-150972 | 5/2004 |
| JP | 2006-017878 A | 1/2006 |
| KR | 10-1998-073340 | 11/1998 |
| KR | 10-2004-0104216 | 12/2004 |

OTHER PUBLICATIONS

Supplementary European Search Report dated Mar. 9, 2012 in European Application No. 07708625.4, filed Jan. 26, 2007.

* cited by examiner

METHOD FOR DISPLAYING BACKGROUND SKY IN NAVIGATION SYSTEM AND APPARATUS THEREOF

CROSS-REFERENCE TO RELATED APPLICATIONS

This application claims priority to International Patent Application No. PCT/KR2007/000464, filed Jan. 26, 2007, which claims priority to Korean Patent Application 10-2006-0038213, filed Apr. 27, 2006, the disclosures of each of which are hereby incorporated by reference.

TECHNICAL FIELD

The present invention relates to a method and apparatus for displaying a background sky in a navigation system, and more particularly, to a method and apparatus for displaying a background sky which displays a different background sky according to a driving direction angle of a vehicle.

BACKGROUND ART

Generally, navigation systems compute current locations of moving vehicles using signals detected by vehicle mounted sensors, and signals transmitted from a plurality of satellites, and thereby display the computed locations on map data.

Currently, navigation systems have been developed to provide users with more graphical images on navigation screens when providing map data according to locations of vehicles.

However, in a conventional art, navigation systems provide background images considering current locations of vehicles when displaying map data. Accordingly, when locations of vehicles are basically not changed and driving directions of vehicles are changed, navigation systems in the conventional art provide the same background images. Thus, navigation systems in the conventional art do not meet users' needs for more graphical map data.

DISCLOSURE OF INVENTION

Technical Goals

The present invention provides a method and apparatus for displaying a background sky in a navigation system which may display a sky image more graphically according to a driving direction angle of a vehicle when displaying a map using perspective in a three-dimensional (3D) mode in the navigation system.

The present invention also provides a method and apparatus for displaying a background sky in a navigation system which enables a user to see a different background sky according to a driving direction angle of a vehicle in the navigation system.

Technical Solutions

According to an aspect of the present invention, there is provided a method of displaying a background sky in a navigation system, the method including: storing and maintaining map data and background sky image data with respect to one or more directions of the map data in a database; detecting a driving direction angle of a vehicle; computing a position of a background sky image corresponding to the detected driving direction angle; extracting background sky image data corresponding to the computed position of the background sky image from the database; and displaying the extracted background sky image data as a background sky with respect to the map data.

According to another aspect of the present invention, there is provided an apparatus for displaying a background sky in a navigation system, the apparatus including: a background sky image storage unit storing and maintaining map data and background sky image data with respect to one or more directions of the map data; an angle detection unit detecting a driving direction angle of a vehicle; an image position computation unit computing a position of a background sky image corresponding to the detected driving direction angle; an image extraction unit extracting background sky image data corresponding to the computed position of the background sky image; and a display unit displaying the extracted background sky image data as a background sky with respect to the map data.

BEST MODE FOR CARRYING OUT THE INVENTION

Figure 1:
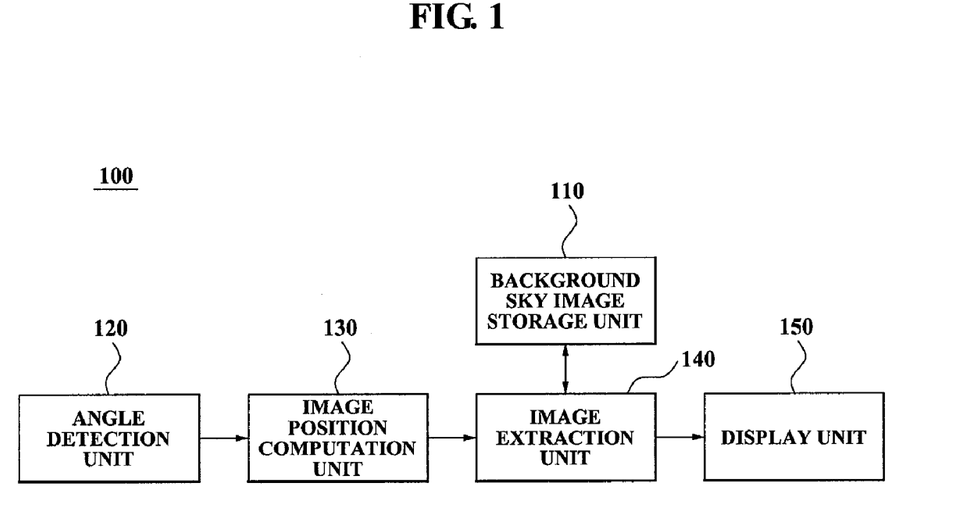
FIG. 1 is a block diagram illustrating a configuration of an apparatus for displaying a background sky in a navigation system according to an embodiment of the present invention.

FIG. 1 is a block diagram illustrating a configuration of an apparatus for displaying a background sky in a navigation system according to an embodiment of the present invention.

Referring to FIG. 1, the apparatus for displaying a background sky in a navigation system 100 according to an embodiment of the present invention includes a background sky image storage unit 110, an angle detection unit 120, an image position computation unit 130, an image extraction unit 140, and a display unit 150.

Figure 2:
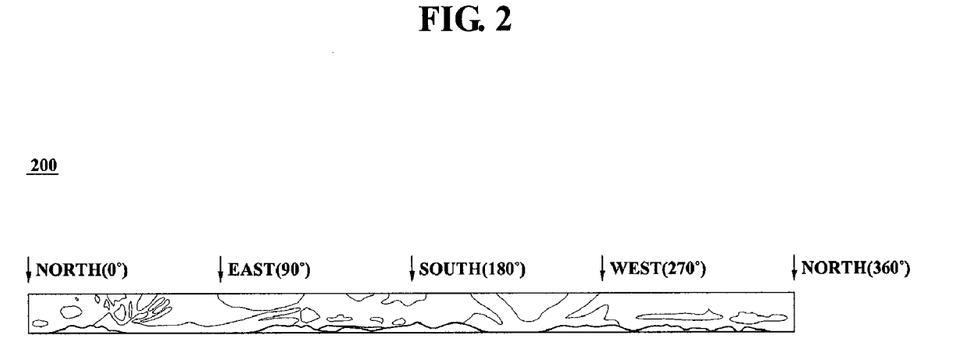
FIG. 2 is a diagram illustrating an example of a background sky panorama image according to an embodiment of the present invention.

The background sky image storage unit 110 stores and maintains map data and background sky image data with respect to one or more directions of the map data. To display the background sky more graphically, the background sky image storage unit 110 designs a sky image of 360°, i.e. sky image of one or more directions, as a single background sky panorama image as illustrated in FIG. 2. Also, the background sky image storage unit 110 stores the background sky panorama image by dividing the background sky panorama image into data of an N number of images.

FIG. 2 is a diagram illustrating an example of a background sky panorama image according to an embodiment of the present invention.

FIG. 2 illustrates the background sky panorama image 200 which is for displaying a background sky more graphically. The background sky panorama image 200 is provided by designing a sky image, which is viewed when rotated clockwise by 360° based on north at 0°, in a single wide image. According to an embodiment of the present invention, the background sky panorama image 200 includes a background sky image in one or more directions, e.g., all angles, such as north 0°, south 180°, east 90°, and west 270°, as illustrated in FIG. 2.

An apparatus for displaying a background sky in a navigation system 100 may divide the wide background sky panorama image of 360° into background sky image data of an N number of images, as illustrated in FIG. 2, and store the background sky image data in a background sky image storage unit 110. In this instance, the wide background sky panorama image includes a sky image.

An angle detection unit 120 detects a driving direction angle of a vehicle where a navigation system is installed. Specifically, when the vehicle changes the driving direction angle, e.g. going straight ahead, turning left, turning right, making a U-turn, and the like, while driving, the angle detection unit 120 detects the changed driving direction angle of the vehicle.

An image position computation unit 130 computes a position of a background sky image corresponding to the detected driving direction angle. According to an embodiment of the present invention, the image position computation unit 130 computes a start point (SP) and an end point (EP) of the background sky image corresponding to the detected driving direction angle.

According to the detected driving direction angle, the image position computation unit 130 computes the SP and the EP of the background sky image to be extracted from the background sky image data by using one or more equations, such as for example, Equation 1 and Equation 2.

$$SP = ((\text{Car Angle} - 15°)/360°) * (2880 \text{ pix}) \quad \text{[Equation 1]}$$

As an example, when the detected driving direction angle is 15°, the image position computation unit 130 substitutes the detected driving direction angle, 15°, for Car Angle in Equation 1. Accordingly, the image position computation unit 130 computes the SP of the background sky image to be extracted from the background sky image data as '0 pix'.

As another example, when detected driving direction angle is 180°, the image position computation unit 130 substitutes the detected driving direction angle, 180°, for Car Angle in Equation 1. Accordingly, the image position computation unit 130 computes the SP of the background sky image to be extracted from the background sky image data as '1320 pix'.

$$EP = ((\text{Car Angle} - 15°)/360°) * (2880 \text{ pix}) + 240 \text{ pix} \quad \text{[Equation 2]}$$

As an example, when the detected driving direction angle is 15°, the image position computation unit 130 substitutes the detected driving direction angle, 15°, for Car Angle in Equation 2. Accordingly, the image position computation unit 130 computes the EP of the background sky image to be extracted from the background sky image data as '240 pix'.

As another example, when detected driving direction angle is 180°, the image position computation unit 130 substitutes the detected driving direction angle, 180°, for Car Angle in Equation 2. Accordingly, the image position computation unit 130 computes the EP of the background sky image to be extracted from the background sky image data as '1560 pix'.

An image extraction unit 140 extracts background sky image data corresponding to the computed position of the background sky image. According to an embodiment of the present invention, the image extraction unit 140 may extract background sky image data corresponding to an area from the SP of the background sky image to the EP of the background sky image, by referring to the computed SP and the computed EP from the background sky image data stored in the background sky image storage unit 110.

As an example, when the detected driving direction angle is 15°, the image extraction unit 140 extracts background sky image data corresponding to an area from the SP of the background sky image, i.e. '0 pix', to the EP of the background sky image, i.e. '240 pix', from the background sky image data stored in the background sky image storage unit 110.

As another example, when detected driving direction angle is 180°, the image extraction unit 140 extracts background sky image data corresponding to an area from the SP of the background sky image, i.e. '1320 pix', to the EP of the background sky image, i.e. '1560 pix', from the background sky image data stored in the background sky image storage unit 110.

When the stored background sky image data is divided into data of an N number of images, the image extraction unit 140 may extract the background sky image data by combining image data corresponding to the computed position of the background sky image from among the data of the N number of images.

Figure 3:
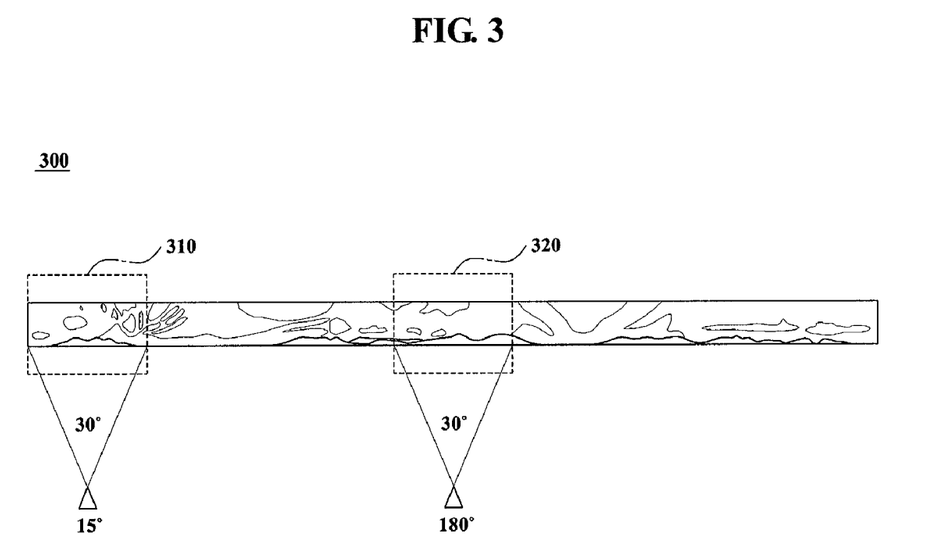
FIG. 3 is a diagram illustrating an example of extracting a background sky image according to a driving direction angle of a vehicle according to an embodiment of the present invention.

FIG. 3 is a diagram illustrating an example of extracting a background sky image according to a driving direction angle of a vehicle according to an embodiment of the present invention.

In FIG. 3, when a first driving direction angle of a vehicle is 15°, an area 310 is an area which is extracted as first background sky image data corresponding to the first driving direction angle of 15° in a background sky panorama image 300. The first background sky image data is obtained when extracting background sky image data within a range, such as for example, a range from −15° to +15°, i.e. from 0° to 30°, based on the first driving direction angle of 15°, from data of the background sky panorama image 300.

Also, when a second driving direction angle of the vehicle is 180°, an area 320 is an area which is extracted as second background sky image data corresponding to the second driving direction angle of 180° in the background sky panorama image 300. The second background sky image data is obtained when extracting background sky image data within a range, such as for example, a range from −15° to +15°, i.e. from 165° to 195', based on the second driving direction angle of 180°, from data of the background sky panorama image 300.

A display unit 150 displays the extracted background sky image data as a background sky with respect to map data. Specifically, the display unit 150 displays the extracted background sky image data on a background area 410 illustrated in FIG. 4.

As described above, the apparatus for displaying a background sky in a navigation system 100 may provide more graphical map data by displaying a different background sky according to the driving direction angle of the vehicle when displaying the map data in a three-dimensional (3D) mode in the navigation system.

Figure 4:
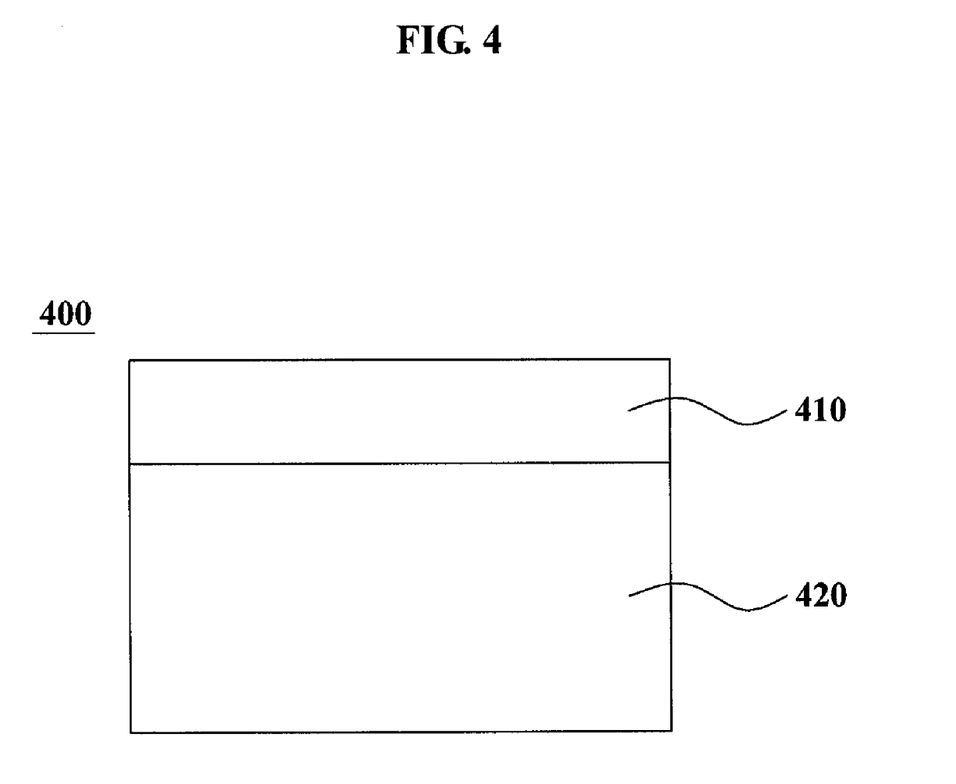
FIG. 4 is a diagram illustrating a navigation screen divided into a background area and a map area according to an embodiment of the present invention.

FIG. 4 is a diagram illustrating a navigation screen divided into a background area and a map area according to an embodiment of the present invention.

Referring to FIG. 4, the navigation screen 400 includes a background area 410 and a map area 420. Background sky image data according to a driving direction angle of a vehicle is displayed on the background area 410. Map data according to a location of the vehicle is displayed on the map area 420. Specifically, different background sky image data according to the driving direction angle of the vehicle is displayed on the background area 410. As an example, when the driving direction angle of the vehicle is 15°, first background sky image data corresponding to a first extraction area such as an area 310 illustrated in FIG. 3 is displayed on the background area 410. Also, when the driving direction angle of the vehicle is 180°, second background sky image data corresponding to a second extraction area such as an area 320 illustrated in FIG. 3 is displayed on the background area 410.

Figure 5:
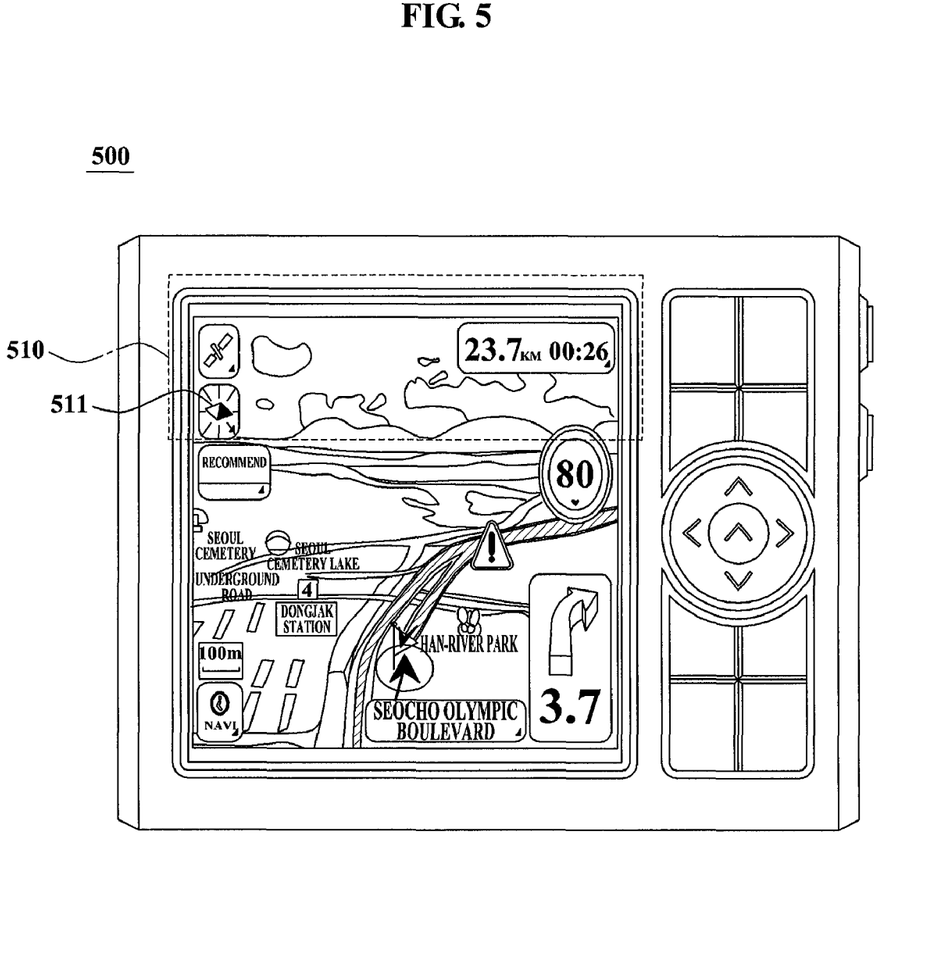
FIG. 5 is a diagram illustrating an example of a navigation screen displaying first background sky image data when a driving direction angle of a vehicle is a first driving direction angle according to an embodiment of the present invention.

FIG. 5 is a diagram illustrating an example of a navigation screen displaying first background sky image data when a driving direction angle of a vehicle is a first driving direction angle according to an embodiment of the present invention.

Referring to FIG. 5, on a navigation screen 500, the first background sky image data according to the first driving direction angle and first map data according to a location of a vehicle are displayed. A background area 510 includes the first background sky image data according to the first driving direction angle and first driving direction angle data 511. The first driving direction angle data 511 is represented as a compass in FIG. 5.

When a driving direction angle, which is detected via an angle detection unit 120, of the vehicle is the first driving direction angle, an image position computation unit 130 of an apparatus for displaying a background sky in a navigation system 100 may compute an SP and an EP of the first background sky image corresponding to the first driving direction angle. An image extraction unit 140 of the apparatus for displaying a background sky in a navigation system 100 may extract the first background sky image data according to the computed SP and the computed EP of the first background sky image from background sky image data stored in a background sky image storage unit 110. Also, a display unit 150 of the apparatus for displaying a background sky in a navigation system 100 may display the extracted first background sky image data and the detected first driving direction angle data 511 on the background area 510.

Figure 6:
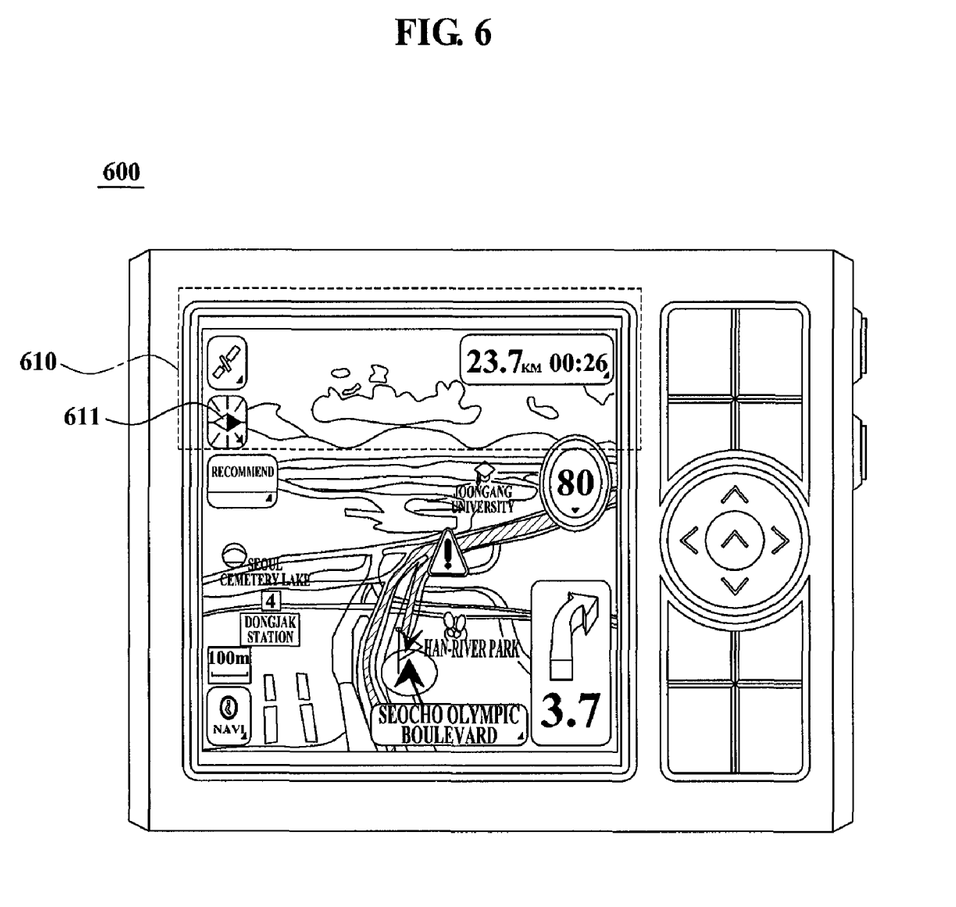
FIG. 6 is a diagram illustrating an example of a navigation screen displaying second background sky image data when a driving direction angle of a vehicle is a second driving direction angle according to an embodiment of the present invention.

FIG. 6 is a diagram illustrating an example of a navigation screen displaying second background sky image data when a driving direction angle of a vehicle is a second driving direction angle according to an embodiment of the present invention.

Referring to FIG. 6, on a navigation screen 600, the second background sky image data according to the second driving direction angle and second map data according to a location of a vehicle are displayed. A background area 610 includes the second background sky image data according to the second driving direction angle and second driving direction angle data 611. The second driving direction angle data 611 is represented as a compass in FIG. 6.

When a driving direction angle, which is detected via an angle detection unit 120, of the vehicle is the second driving direction angle, an image position computation unit 130 of an apparatus for displaying a background sky in a navigation system 100 may compute an SP and an EP of the second background sky image corresponding to the second driving direction angle. An image extraction unit 140 of the apparatus for displaying a background sky in a navigation system 100 may extract the second background sky image data according to the computed SP and the computed EP of the second background sky image from background sky image data stored in a background sky image storage unit 110. Also, a display unit 150 of the apparatus for displaying a background sky in a navigation system 100 may display the extracted second background sky image data and the detected second driving direction angle data 611 on the background area 610.

Figure 7:
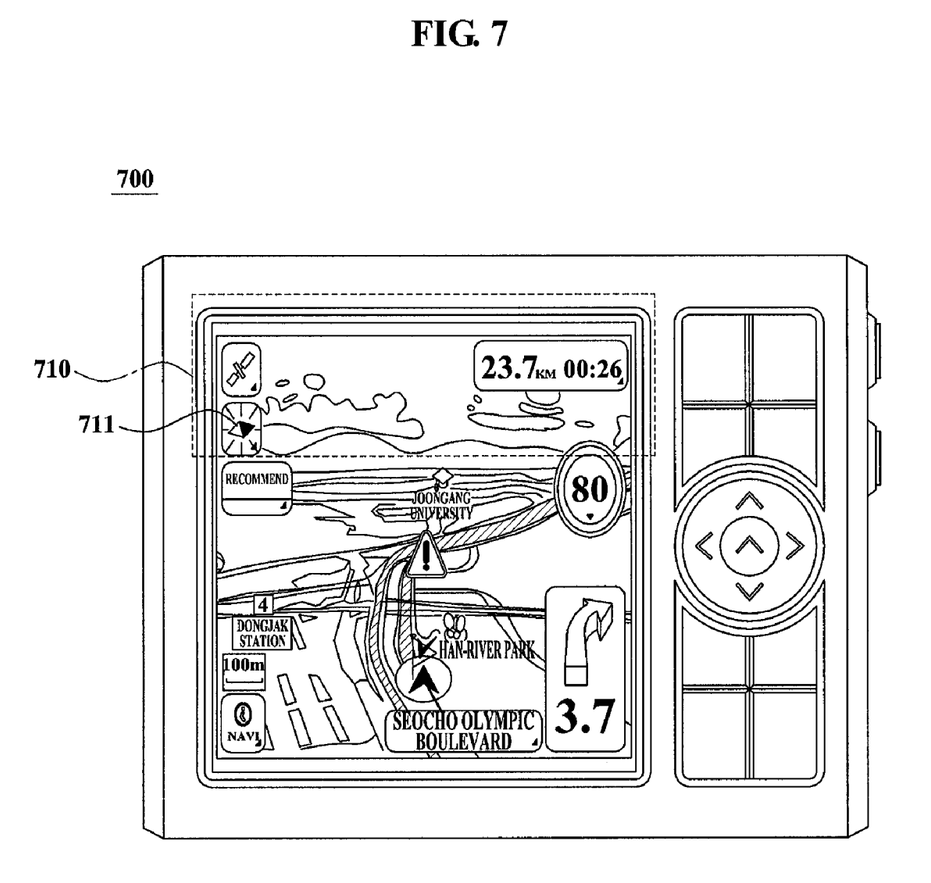
FIG. 7 is a diagram illustrating an example of a navigation screen displaying third background sky image data when a driving direction angle of a vehicle is a third driving direction angle according to an embodiment of the present invention.

FIG. 7 is a diagram illustrating an example of a navigation screen displaying third background sky image data when a driving direction angle of a vehicle is a third driving direction angle according to an embodiment of the present invention.

Referring to FIG. 7, on a navigation screen 700, the third background sky image data according to the third driving direction angle and third map data according to a location of a vehicle are displayed. A background area 710 includes the third background sky image data according to the third driving direction angle and third driving direction angle data 711. The third driving direction angle data 711 is represented as a compass in FIG. 7.

When a driving direction angle, which is detected via an angle detection unit 120, of the vehicle is the third driving direction angle, an image position computation unit 130 of an apparatus for displaying a background sky in a navigation system 100 may compute an SP and an EP of the third background sky image corresponding to the third driving direction angle. An image extraction unit 140 of the apparatus for displaying a background sky in a navigation system 100 may extract the third background sky image data according to the computed SP and the computed EP of the third background sky image from background sky image data stored in a background sky image storage unit 110. Also, a display unit 150 of the apparatus for displaying a background sky in a navigation system 100 may display the extracted third background sky image data and the detected third driving direction angle data 711 on the background area 710.

Figure 8:
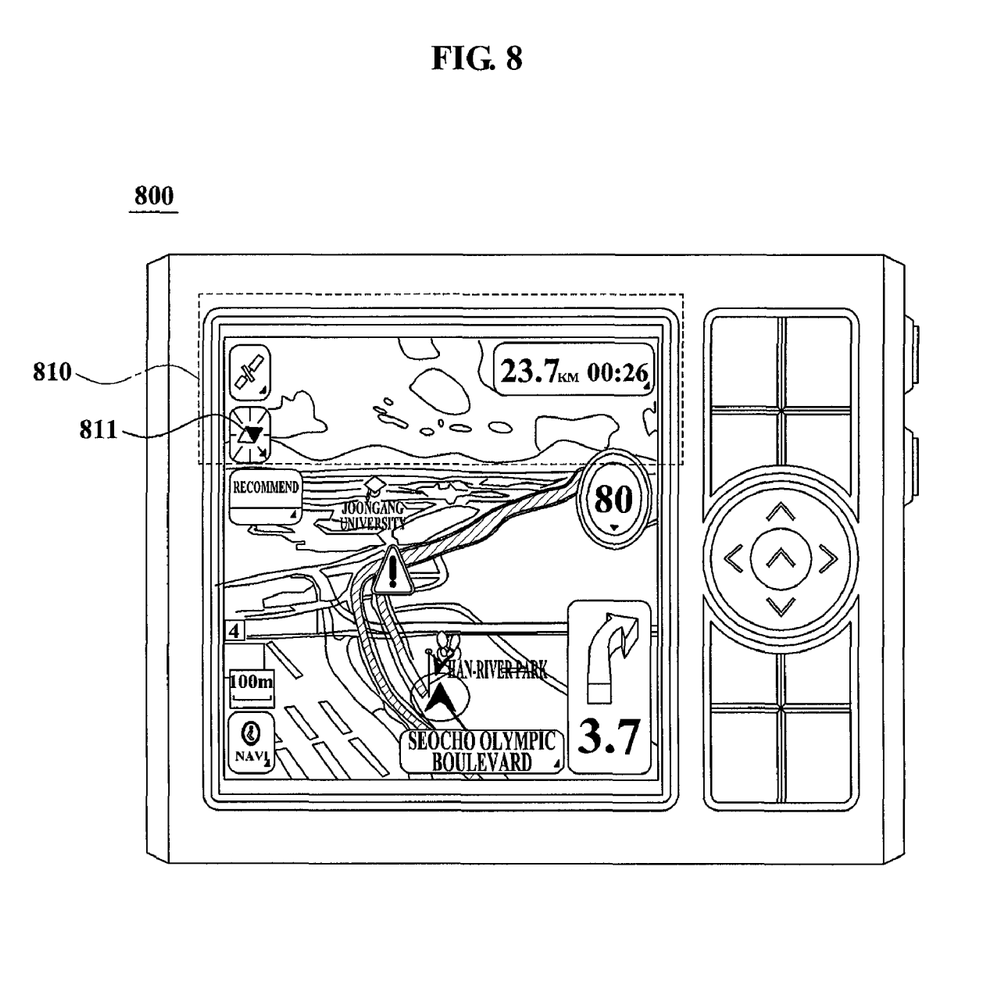
FIG. 8 is a diagram illustrating an example of a navigation screen displaying fourth background sky image data when a driving direction angle of a vehicle is a fourth driving direction angle according to an embodiment of the present invention.

FIG. 8 is a diagram illustrating an example of a navigation screen displaying fourth background sky image data when a driving direction angle of a vehicle is a fourth driving direction angle according to an embodiment of the present invention.

Referring to FIG. 8, on a navigation screen 800, the fourth background sky image data according to the fourth driving direction angle and fourth map data according to a location of a vehicle are displayed. A background area 810 includes the fourth background sky image data according to the fourth driving direction angle and fourth driving direction angle data 811. The fourth driving direction angle data 811 is represented as a compass in FIG. 8.

When a driving direction angle, which is detected via an angle detection unit 120, of the vehicle is the fourth driving direction angle, an image position computation unit 130 of an apparatus for displaying a background sky in a navigation system 100 may compute an SP and an EP of the fourth background sky image corresponding to the fourth driving direction angle. An image extraction unit 140 of the apparatus for displaying a background sky in a navigation system 100 may extract the fourth background sky image data according to the computed SP and the computed EP of the fourth background sky image from background sky image data stored in a background sky image storage unit 110. Also, a display unit 150 of the apparatus for displaying a background sky in a navigation system 100 may display the extracted fourth background sky image data and the detected fourth driving direction angle data 811 on the background area 810.

As described above, the apparatus for displaying a background sky in a navigation system 100 may provide a more graphical navigation screen by displaying different background sky image data according to the driving direction angle of the vehicle.

Figure 9:
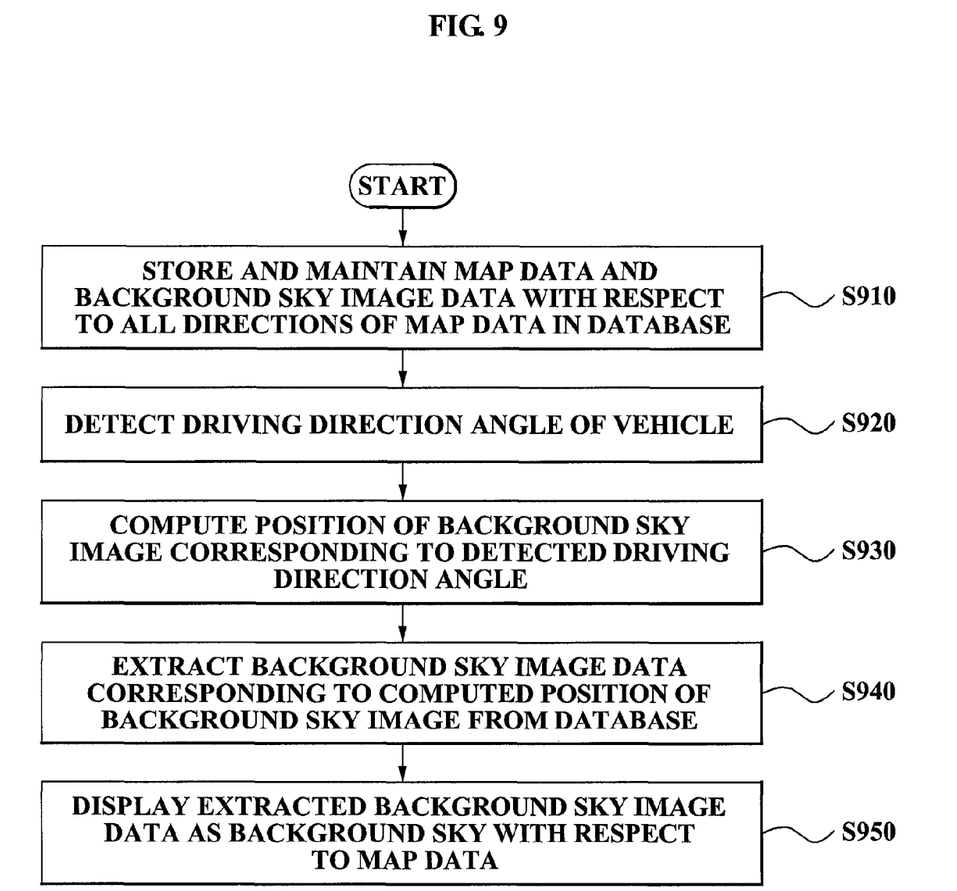
FIG. 9 is a flowchart illustrating a method of displaying a background sky in a navigation system according to another embodiment of the present invention.

FIG. 9 is a flowchart illustrating a method of displaying a background sky in a navigation system according to another embodiment of the present invention.

Referring to FIG. 9, in operation S910, a navigation system stores and maintains map data and background sky image data with respect to one or more directions of the map data in a database. The background sky image data with respect to one or more directions of the map data may be stored by dividing a background sky panorama image of 360° into data of an N number of images.

In operation S920, the navigation system detects a driving direction angle of a vehicle. Specifically, when a driving direction of the vehicle changes, e.g. going straight ahead, turning left, turning right, making a U-turn, and the like, the changed driving direction angle of the vehicle is detected.

In operation S930, the navigation system computes a position of a background sky image corresponding to the detected driving direction angle. According to an embodiment of the present invention, the navigation system computes an SP and an EP of the background sky image corresponding to the detected driving direction angle.

As an example, when the detected driving direction angle is 15°, the navigation system may utilize one or more equations to identify background sky image data to be extracted, such as for example, Equations 1 and 2 described with reference to FIG. 2. The navigation system may substitute the detected driving direction angle, 15°, for Car Angle in Equation 1 described with reference to FIG. 2. Accordingly, the navigation system computes the SP of the background sky image to be extracted from the background sky image data, stored in the database, as '0 pix'. Also, the navigation system substitutes the detected driving direction angle, 15°, for Car Angle in Equation 2 described with reference to FIG. 2. Accordingly, the navigation system computes the EP of the background sky image to be extracted from the background sky image data as '240 pix'.

As another example, when detected driving direction angle is 180°, the navigation system substitutes the detected driving direction angle, 180°, for Car Angle in Equation 1 described with reference to FIG. 2. Accordingly, the navigation system computes the SP of the background sky image to be extracted from the background sky image data, stored in the database, as '1320 pix'. Also, the navigation system substitutes the detected driving direction angle, 180°, into Equation 2 described in FIG. 2. Accordingly, the navigation system computes the EP of the background sky image to be extracted from the background sky image data as '1560 pix'.

In operation S940, the navigation system extracts background sky image data corresponding to the computed position of the background sky image from the database. According to an embodiment of the present invention, the navigation system extracts background sky image data corresponding to an area from the computed SP of the background sky image to the computed EP of the background sky image from the background sky image data stored in the database.

As an example, when the detected driving direction angle is 15°, the navigation system extracts background sky image data corresponding to an area from the SP of the background sky image, i.e. '0 pix', to the EP of the background sky image, i.e. '240 pix', from the background sky image data stored in the database.

As another example, when detected driving direction angle is 180°, the navigation system extracts background sky image data corresponding to an area from the SP of the background sky image, i.e. '1320 pix', to the EP of the background sky image, i.e. '1560 pix', from the background sky image data stored in the database.

Also, in operation S940, when the background sky panorama image is divided into the data of N number of images, the navigation system may extract the background sky image data by combining image data corresponding to the computed position of the background sky image from among the data of N number of images.

In operation S950, the navigation system displays the extracted background sky image data as a background sky with respect to the map data. Specifically, the navigation system displays the background sky image data, which is extracted according to the driving direction angle of the vehicle, as the background sky in a background area of a navigation screen illustrated in FIGS. 5, 6, 7, and 8.

As described above, the method of displaying a background sky in a navigation system according to another embodiment of the present invention detects the driving direction angle of the vehicle, displays a different background sky image according to the detected driving direction angle, when providing map data in 3D mode in the navigation system, and thereby may provide a user with a more graphical 3D mode display screen.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, a method and apparatus for displaying a background sky in a navigation system may display a different background sky according to a driving direction angle of a vehicle in the navigation system.

Also, according to the present invention, a method and apparatus for displaying a background sky in a navigation system displays a background sky graphically according to a driving direction angle of a vehicle when displaying map data in a 3D mode in the navigation system, and thereby may provide more graphical map data.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of displaying a background sky in a navigation system, the method comprising: storing and maintaining map data and background sky image data with respect to one or more directions of the map data in a database of the navigation system; detecting a driving direction angle of a vehicle; computing a position of a background sky image corresponding to the detected driving direction angle, wherein the computing comprises: computing a start position (SP) of the background sky image corresponding to the detected driving direction angle and computing an end position (EP) of the background sky image corresponding to the detected driving direction angle; extracting background sky image data corresponding to the computed position of the background sky image from the database, wherein the extracting extracts background sky image data corresponding to an area from the SP of the background sky image to the EP of the background sky image from the background sky image data stored in the database; and displaying the extracted background sky image data as a background sky with respect to the map data on a navigation screen of the navigation system.

2. The method of claim 1, wherein the storing and maintaining divides a background sky panorama image of 360° into data of an N number of images, stores and maintains the data of the N number of images in the database, and the extracting extracts the background sky image data by combining image data corresponding to the computed position of the background sky image from among the data of the N number of images.

3. An apparatus for displaying a background sky in a navigation system, the apparatus comprising: a background sky image storage unit storing and maintaining map data and background sky image data in the navigation system with respect to one or more directions of the map data; an angle detection unit for detecting a driving direction angle of a vehicle; an image position computation unit for computing a position of a background sky image corresponding to the detected driving direction angle, wherein the image position computation unit computes a start position (SP) of the background sky image corresponding to the detected driving direction angle, and computes an end position (EP) of the background sky image corresponding to the detected driving direction angle; an image extraction unit for receiving the computed position of the background sky image from the image position computation unit and extracting background sky image data corresponding to the computed position of the background sky image, wherein the image extraction unit extracts background sky image data corresponding to an area from the start SP of the background sky image to the EP of the background sky image from the background sky image data stored in the database; and a display unit for receiving the extracted background sky image data from the image extraction unit and displaying the extracted background sky image data as a background sky with respect to the map data on a navigation screen of the navigation system.

4. The apparatus of claim 3, wherein the background sky image storage unit stores a background sky panorama image data of 360° by dividing the background sky panorama image data of 360° into data of an N number of images, and the image extraction unit extracts the background sky image data by combining image data corresponding to the computed position of the background sky image from among the data of the N number of images.

5. A non-transitory computer-readable recording medium storing a program including executable instructions for implementing a method comprising: storing and maintaining map data and background sky image data with respect to one or more directions of the map data in a database; detecting a driving direction angle of a vehicle; computing a position of a background sky image corresponding to the detected driving direction angle, wherein the computing comprises: computing a start position (SP) of the background sky image corresponding to the detected driving direction angle; and computing an end position (EP) of the background sky image corresponding to the detected driving direction angle; extracting background sky image data corresponding to the computed position of the background sky image from the database, wherein the extracting extracts background sky image data corresponding to an area from the SP of the background sky image to the EP of the background sky image from the background sky image data stored in the database; and displaying the extracted background sky image data as a background sky with respect to the map data on a navigation screen of a navigation system.

6. The non-transitory computer-readable recording medium according to claim 5, wherein the storing and maintaining divides a background sky panorama image of 360° into data of an N number of images and stores and maintains the data of the N number of images in the database, and the extracting extracts the background sky image data by combining image data corresponding to the computed position of the background sky image from among the data of the N number of images.

* * * * *